US012705383B2

(12) United States Patent
Mehta et al.

(10) Patent No.: US 12,705,383 B2
(45) Date of Patent: Aug. 11, 2026

(54) SYSTEMS AND METHODS FOR IN-SITU QUALITY EVALUATION OF SENSITIVE DATA

(71) Applicant: JPMorgan Chase Bank, N.A., New York, NY (US)

(72) Inventors: Hemal Mehta, Singapore (SG); Akash R. Mitra, Jalpaiguri (IN); Matthew S. Wong, Singapore (SG); Rajendrapal Gambhir, Singapore (SG); Rishabh Sharma, Bangalore (IN); Naveen Kamplikar, Singapore (SG); Laura Quah, Singapore (SG); Puneet Chaturvedi, Singapore (SG); Adrian Tan, Singapore (SG)

(73) Assignee: JPMorgan Chase Bank, N.A., New York, NY (US)

( * ) Notice: Subject to any disclaimer, the term of this patent is extended or adjusted under 35 U.S.C. 154(b) by 12 days.

(21) Appl. No.: 18/882,871

(22) Filed: Sep. 12, 2024

(65) Prior Publication Data

US 2026/0037658 A1 Feb. 5, 2026

(30) Foreign Application Priority Data

Jul. 30, 2024 (IN) ............................ 202411057546

(51) Int. Cl.
*G06F 21/62* (2013.01)

(52) U.S. Cl.
CPC ................................ *G06F 21/6218* (2013.01)

(58) Field of Classification Search
CPC .... G06F 21/62; G06F 21/6218; G06F 16/283; G06F 16/284; G06F 16/2365; G06Q 10/06395

(Continued)

(56) References Cited

U.S. PATENT DOCUMENTS

2013/0091170 A1* 4/2013 Zhang .............. G06Q 10/06313 707/783
2013/0297477 A1* 11/2013 Overman .............. G06Q 40/00 705/37

(Continued)

OTHER PUBLICATIONS

Ma, Kwan-Liu, Chaoli Wang, Hongfeng Yu, and Anna Tikhonova. "In-situ processing and visualization for ultrascale simulations." In Journal of Physics: Conference Series, vol. 78, No. 1, p. 012043. IOP Publishing, 2007 (Year: 2007).*

(Continued)

*Primary Examiner* — James N Fiorillo
(74) *Attorney, Agent, or Firm* — Guntin & Gust, PLC; Kenneth S. Kwan

(57) ABSTRACT

Aspects of the subject disclosure may include, for example, a processing platform configured to analyze data quality evaluation requirements associated with source data, identify data quality evaluation algorithm(s) based on an analysis of the data quality evaluation requirements, and store metadata relating to evaluation of the source data, and an execution platform configured to receive the data quality evaluation algorithm(s) from the processing platform and execute the data quality evaluation algorithm(s) for the evaluation of the source data to derive data quality metrics, and provide the data quality metrics to the processing platform for storage as the metadata, wherein the processing platform is segregated from the execution platform by network(s), and wherein the execution platform is implemented with in-situ access to the source data such that the source data is withheld from being shared with system(s) outside of the execution platform during the evaluation, thereby ensuring data integrity/locality compliance.

20 Claims, 6 Drawing Sheets

(58) Field of Classification Search
USPC .......................................................... 726/26
See application file for complete search history.

(56) References Cited

U.S. PATENT DOCUMENTS

2014/0046906 A1* 2/2014 Patiejunas ........... G06F 21/6209 707/661
2014/0046909 A1* 2/2014 Patiejunas ......... G06F 16/24554 707/687
2016/0179979 A1* 6/2016 Aasman ............ G06F 16/24532 707/603
2020/0379994 A1* 12/2020 Rajaperumal ....... G06F 16/2393
2021/0103587 A1* 4/2021 Rajaperumal ......... G06F 16/256
2021/0248128 A1* 8/2021 Raman .................. G06F 16/254
2023/0011376 A1* 1/2023 Blum .................... G06F 16/245
2023/0069866 A1* 3/2023 Contreras ............. G06F 16/284
2023/0205743 A1* 6/2023 Johnas ................ G06F 21/6218 707/692
2024/0020291 A1* 1/2024 Nogles, Jr. .......... G06F 16/2365
2024/0265465 A1* 8/2024 Thompson ............ H04L 9/3213
2024/0273227 A1* 8/2024 Thompson .......... G06F 21/6218
2025/0013209 A1* 1/2025 Khare ................ G05B 13/0265
2025/0259144 A1* 8/2025 Crabtree ............ G06Q 30/0601
2025/0260565 A1* 8/2025 Abdelsamie .......... H04L 9/3239
2025/0335449 A1* 10/2025 Christner ................ H04L 67/60

OTHER PUBLICATIONS

J. C. Bennett et al., “Combining in-situ and in-transit processing to enable extreme-scale scientific analysis,” SC ’12: Proceedings of the International Conference on High Performance Computing, Networking, Storage and Analysis, Salt Lake City, UT, USA, 2012, pp. 1-9, (Year: 2012).*

* cited by examiner

300

310

SYSTEMS AND METHODS FOR IN-SITU QUALITY EVALUATION OF SENSITIVE DATA

CROSS-REFERENCE TO RELATED APPLICATION

The present application claims priority to Indian Patent Application No. 202411057546 filed on Jul. 30, 2024. All sections of the aforementioned application are incorporated herein by reference in their entirety.

FIELD OF THE DISCLOSURE

The subject disclosure generally relates to methods and systems for in-situ quality evaluation of sensitive data.

BACKGROUND

In today's data-driven world, organizations, such as businesses, governments, etc., rely on data to drive growth and make informed decisions. The accuracy, completeness, and reliability of this data are therefore of utmost importance for these organizations to meet their goals.

Organizations face a critical challenge when it comes to protecting their sensitive business data, which can include wholesale payments data, customer-related data, and so on. Presently available data quality evaluation systems (e.g., software-as-a-service (SaaS)- or platform-as-a-service (Paas)-based systems) require organizations to send or share at least some of their sensitive data out of their native environment to a central processing environment for the assessment. This makes it impossible for the organizations to adhere to data locality requirements that may be imposed by various local and global regulators. Additionally, the need to "move the data" poses significant risks in terms of data security and privacy, and can also negatively impact the performance of the quality evaluation process. Moreover, existing solutions are often rigid, not allowing for customization based on specific data governance needs of the organization, which may vary across jurisdictions due to differing legal requirements. The limitations imposed by traditional data quality evaluation systems thus make them unsuitable for processing private and sensitive business data.

SUMMARY OF THE DISCLOSURE

One or more aspects of the subject disclosure include a system. The system may include a processing platform configured to analyze data quality evaluation requirements associated with source data, identify one or more data quality evaluation algorithms based at least in part on an analysis of the data quality evaluation requirements, and store metadata relating to evaluation of the source data. The system may further include an execution platform configured to receive the one or more data quality evaluation algorithms from the processing platform and execute the one or more data quality evaluation algorithms for the evaluation of the source data to derive data quality metrics, and provide the data quality metrics to the processing platform for storage as the metadata, wherein the processing platform is segregated from the execution platform by one or more networks, and wherein the execution platform is implemented with in-situ access to the source data such that the source data is withheld from being shared with a system outside of the execution platform during the evaluation, thereby ensuring data integrity, data locality compliance, or both.

One or more aspects of the subject disclosure include a non-transitory machine-readable medium, including executable instructions that, when executed by a processing platform including a processor, facilitate performance of operations. The operations may include receiving, from a user device, a request to perform data quality evaluation of source data, wherein the source data is located in an environment that is segregated from the processing platform. The operations may further include identifying one or more data quality processing algorithms based on the request. The operations may further include causing the one or more data quality processing algorithms to be provided to an execution platform that is implemented in the environment with in-situ access to the source data, thereby enabling the execution platform to perform the data quality evaluation using the one or more data quality processing algorithms. The operations may further include receiving, from the execution platform, data quality metrics resulting from the data quality evaluation.

One or more aspects of the subject disclosure include a method. The method may include obtaining, from a processing platform by an execution platform including a processor, one or more data quality processing algorithms to be used for evaluating data quality of source data. The method may further include performing, by the execution platform, a data quality evaluation of the source data using the one or more data quality processing algorithms, resulting in data quality metrics. The method may further include causing, by the execution platform, the data quality metrics to be provided to the processing platform for storage, wherein the execution platform is implemented with in-situ access to the source data such that the data quality evaluation is performed in-situ with the source data, thereby enabling data integrity, data locality compliance, or both during the data quality evaluation.

BRIEF DESCRIPTION OF THE DRAWINGS

Reference will now be made to the accompanying drawings, which are not necessarily drawn to scale, and wherein.

DETAILED DESCRIPTION

Figure 1:
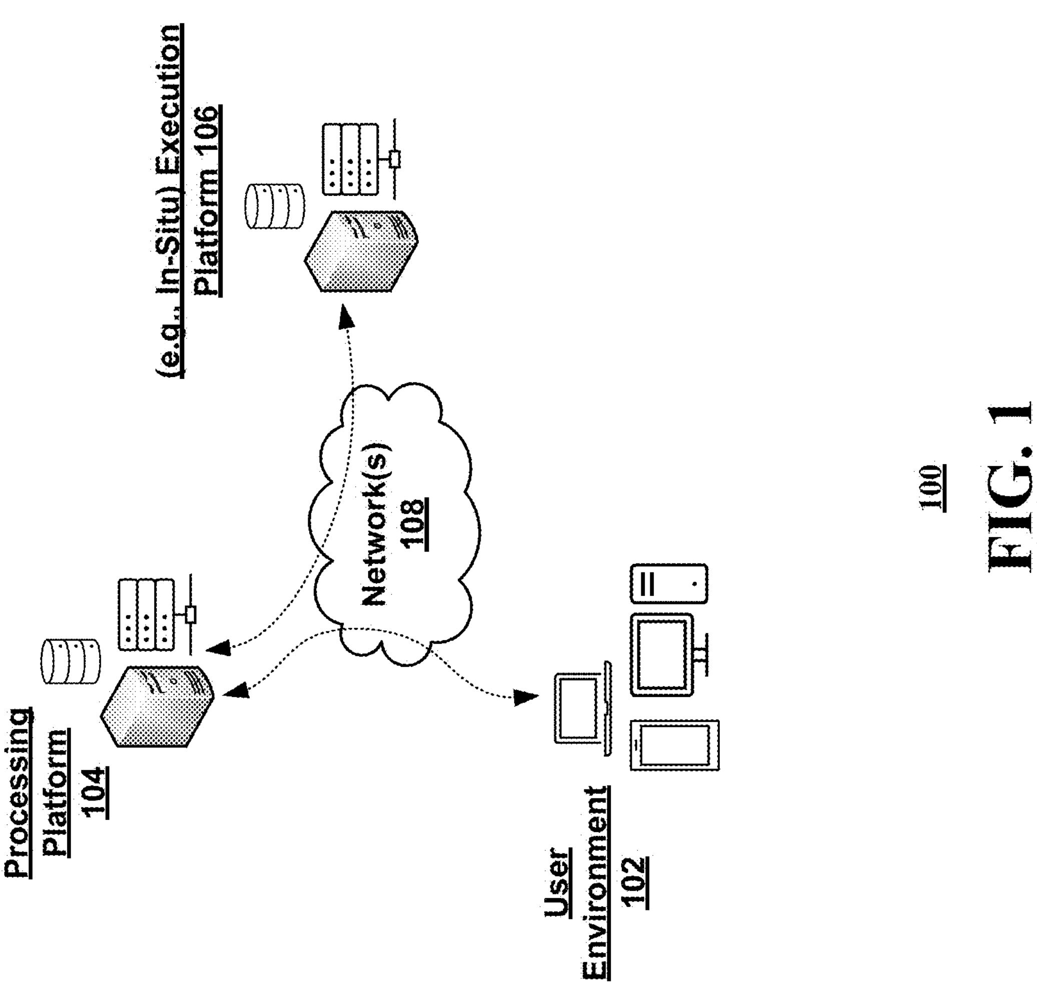
FIG. 1 illustrates an example environment that facilitates segregated data quality evaluation, in accordance with various aspects described herein.

The subject disclosure generally relates to a data quality evaluation architecture (e.g., a data quality-as-a-service (DQaaS) framework) that is capable of facilitating in-situ data quality assessments of sensitive data by leveraging cloud-based resources without jeopardizing data localization. In exemplary embodiments, the exemplary architecture may include a variety of components, including cloud-based data preprocessing modules, client-side execution modules, and secure (i.e., isolated and controlled) execution environments for executing quality assessment processes, which ensures that sensitive data remains protected and inaccessible to unauthorized entities throughout the assessment process. In various embodiments, the data quality framework may include a processing platform (or processing context), an in-situ execution platform (or execution context), and a user environment (or user context). In one or more embodiments, the exemplary architecture may (e.g., additionally or optionally) feature "Bring Your Own Code" (BYOC) capabilities (provided by a module for functional code execution) that empower users to develop, customize, deploy, and/or execute their own data quality evaluation algorithm(s) in the data quality assessment pipeline. In this way, functions may be written and deployed (e.g., by users) for execution in a cloud environment for data processing purposes, while ensuring data locality and confidentiality as well as compliance with regulatory and/or privacy requirements across jurisdictions.

It will be understood and appreciated that exemplary embodiments of the data quality evaluation architecture enable data quality assessments to be performed directly within a user's system or account, whether the data is locally-hosted or cloud-based and regardless of whether the data is static or dynamic. This advantageously promotes efficient utilization of cloud resources, reduces or minimizes data transfer overhead, and facilitates real-time or batch-mode assessments depending on user preferences. Leveraging a BYOC execution capability within the underlying cloud infrastructure also allows users to seamlessly integrate their algorithm(s) into the framework's user-side application execution environment, which enables customizable data quality assessments that meet the user's needs. In this way, data quality assessments may, for instance, be performed within the confines of a secure, cloud-based or local environment, utilizing customizable algorithms provided by the users themselves.

Traditionally, business analysts wrote explicit assertions for data quality evaluation. Nowadays, it is possible to discover data quality anomalies automatically and proactively with the aid of various technologies, such as conventional machine learning (ML) (e.g., logistic regression algorithms, support vector machine (SVM) algorithms, decision tree algorithms, etc.) and statistical intelligence (SI) (e.g., quartile analysis, standard deviation techniques, etc.). While these conventional approaches generally work well for identifying simpler data quality issues—e.g., out of range values, dimensional anomalies, or the like—they are often not very effective at detecting complex, hidden, multi-dimensional data quality issues. Thus, in some embodiments, the data quality evaluation architecture described herein may leverage deep neural network(s) (DNN(s)) to detect quality issues at scale. The DNNs may be capable of uncovering hidden data issues in multi-dimensional datasets that ordinary ML algorithms may miss. This reduces or eliminates the need for rule specification/assertions and advantageously improves time-to-market.

The following is a glossary of terms that may be used herein.

Application Programming Interface (API): A set of rules and protocols for building and interacting with software applications, allowing different software systems to communicate.

BYOC: Refers to the capability within a system that allows users to create and deploy their own custom code, enhancing flexibility and personalization.

Distributed Query Engine: Software that allows structured query language (SQL) queries to be executed across multiple, heterogeneous data sources, consolidating results without moving or sharing underlying data.

Hypertext Transfer Protocol (HTTP) web server: A server that handles HTTP requests from clients, delivering web pages and other content over an Internet or a local network.

In-situ processing: Refers to processing of data in or within its original location or environment, which reduces, minimizes, or avoids data movement and enhances data security.

Load balancer: A device or software that distributes network or application traffic across a number of servers, enhancing the responsiveness and availability of applications.

Object database: A database management system in which information is represented in the form of objects as used in object-oriented programming.

OSI: Open Systems Interconnection.

Layer 3 (Network Layer): The third layer in the OSI model responsible for packet forwarding including routing through different routers.

OSI Layer 7 (Application Layer): The top layer in the OSI model that provides high-level APIs, including resource sharing, remote file access, and directory services.

PaaS: A cloud computing service model that provides customers with hardware and software tools available over an Internet; typically used for application development.

RESTful APIs: APIs that adhere to the constraints of the Representational State Transfer (REST) architectural style, allowing for interaction with RESTful web services.

Reverse proxy: A type of proxy server that retrieves resources on behalf of a client from one or more servers. These resources are then returned to the client as though they originated from the proxy server itself.

SaaS: A software distribution model in which applications are hosted by a third-party provider and made available to customers over an Internet.

Serverless: An architectural pattern where the management of the infrastructure and scaling is handled by a cloud provider, allowing developers to focus solely on the code.

Web service: A software service used to communicate between two devices over a network; often utilizes APIs.

In various embodiments, a data quality evaluation system may perform in-situ data quality assessments, and may support data quality operations with high availability and rapid access, enhancing security and regulatory compliance. The system may include a processing platform that is equipped with a scalable application system that identifies and/or provides data quality evaluation algorithms for use in evaluation of source data. The system may additionally, or alternatively, include an in-situ execution platform for deploying and executing the data quality evaluation algorithms directly within the data's native environment.

The processing platform may include interface(s) that facilitate user interaction with the data quality system. In various embodiments, the interface(s) may provide web-based portals or APIs for secure, authenticated, centralized access, enabling users to submit data quality jobs, retrieve results, and/or inject BYOC algorithms. For instance, the interface(s) may enable custom code injections, ensuring secure, efficient data querying and processing. The processing platform may additionally, or alternatively, include a metadata store for managing data quality-related metadata. In one or more embodiments, the metadata store may be (e.g., exclusively) for storing metadata and may not store any of the actual source (e.g., business) data.

In one or more embodiments, the execution platform may include an in-situ execution module that is capable of executing either or both of pre-defined data quality evaluation algorithms (e.g., received from the processing platform) and user-provided data quality evaluation algorithms, thereby enabling customized data quality assessments. The in-situ execution module may manage execution requests and processing outcomes to ensure data integrity and compliance with data locality requirements.

In various embodiments, the execution platform may include a federated query interface (FQI) that integrates with third-party distributed query engines to execute sophisticated queries across distributed data systems without "moving" (or sharing) source data, ensuring compliance with data locality requirements. The data quality evaluation system may additionally, or alternatively, include a BYOC interface that allows users to inject custom functions into the data processing workflow, supporting extensible and customizable data quality checks.

In one or more embodiments, the execution platform may include a caching layer that optimizes performance and reduces the load on primary data storage systems during data quality assessments. The caching layer may enhance real-time responsiveness and efficiency of data retrieval and processing.

In various embodiments, data quality assessments may be performed in real-time (or near real-time) as source data is obtained at a data collection point, or in batch mode (e.g., based on user requirements). In one or more embodiments, data quality assessments may be performed using a scalable application server architecture (e.g., in the execution platform), which supports varying loads and ensures consistent performance across multiple users and simultaneous jobs.

In various embodiments, the execution platform may include a transient data storage (TDS) that (e.g., temporarily) caches data during intensive computations to enhance performance. The TDS may enable direct downloading of pre-calculated, detailed data quality results.

As described in more detail below, the data quality evaluation system may provide for an executor registration control flow in which executor(s) within the in-situ execution platform may automatically send a registration request to a processing platform upon instantiation, enhancing operational efficiency and system scalability.

As also described in more detail below, the data quality evaluation system may provide for a command control flow that supports data discovery and quality commands. This enables the discovery of data within the execution platform and registration of related metadata as well as execution of commands through the FQI or BYOC interface with support for parallel or serial processing.

FIG. 1 illustrates an example environment 100 that facilitates segregated data quality evaluation. While existing centrally managed data quality frameworks (often implemented as SaaS or PaaS tools) can take advantage of shared computational resources, streamlined deployments, automatic software updates, and reduced maintenance overhead, they also unduly require data to be moved out of its native environment for processing. The exemplary architecture of the data quality evaluation system of FIG. 1, in contrast, advantageously enables in-situ processing of sensitive data, without jeopardizing a managed data quality framework.

As shown in FIG. 1, the environment 100 may include a user environment 102, a processing platform 104, an execution platform 106, and network(s) 108. In various embodiments, the user environment 102 may include one or more computing devices that are capable of inputting/outputting user inputs and communicating information with other devices/systems over the network(s) 108. As some non-limiting examples, the user environment 102 may be or may include a desktop computer, a laptop computer, a tablet computer, a mobile phone, a wearable device (e.g., a smart wristwatch, a pair of smart eyeglasses, media-related gear (e.g., augmented reality (AR), virtual reality (VR), or mixed reality (MR) glasses and/or headset/headphones)), any other similar type of device, any other different type of device, or a combination of some or all of these devices.

In various embodiments, the processing platform 104 may function as a central administrative and orchestration system for facilitating data quality evaluations. In one or more embodiments, the processing platform 104 may include one or more computing devices that are capable of processing data quality evaluation requests from user device(s) in the user environment 102, and coordinating with various executors in the execution platform 106 to effect data quality evaluations. Managing orchestration of data quality tasks may include communications with the execution platform 106, scheduling, and resource allocation. In certain embodiments, the processing platform 104 may be implemented or configured externally from the execution platform 106, meaning that they may be implemented in different networks. As an example, the execution platform 106 may be implemented in a tenant account or a cross-account that is separate from the systems that host the processing platform 104. In some embodiments, the processing platform 104 may be operated by or associated with a data quality service provider, whereas the execution platform 106 may be operated by or associated with a user or an entity (e.g., an organization) that is distinct from the data quality service provider. For instance, the organization may be user or a client of the data quality services provided by the data quality service provider's processing platform 104. The execution platform 106 may, in some contexts, be provided by the data quality service provider for installation/deployment/use in the user or entity's local or cloud-based system(s)/account(s).

In various embodiments, the execution platform 106 may include one or more computing devices that are capable of performing data quality evaluations, such as data profiling, anomaly detection, assertion execution, and/or the like. In one or more embodiments, the execution platform 106 may be configured to ensure that data assessments are performed locally (i.e., at or close to the source(s) of data, such as within the same internal network environment as the source(s) of data) so as to comply with data locality regulations and to enhance security and performance.

The network(s) 108 may facilitate communications between the various environment(s)/platform(s). For instance, the user environment 102 and the processing platform 104 may be communicatively coupled to one another and/or the processing platform 104 and the execution environment 106 may be communicatively coupled to one another by way of wired and/or wireless networks (e.g., Wi-Fi network(s), Bluetooth network(s), wireless RAN(s), and/or the like).

Figure 2A:
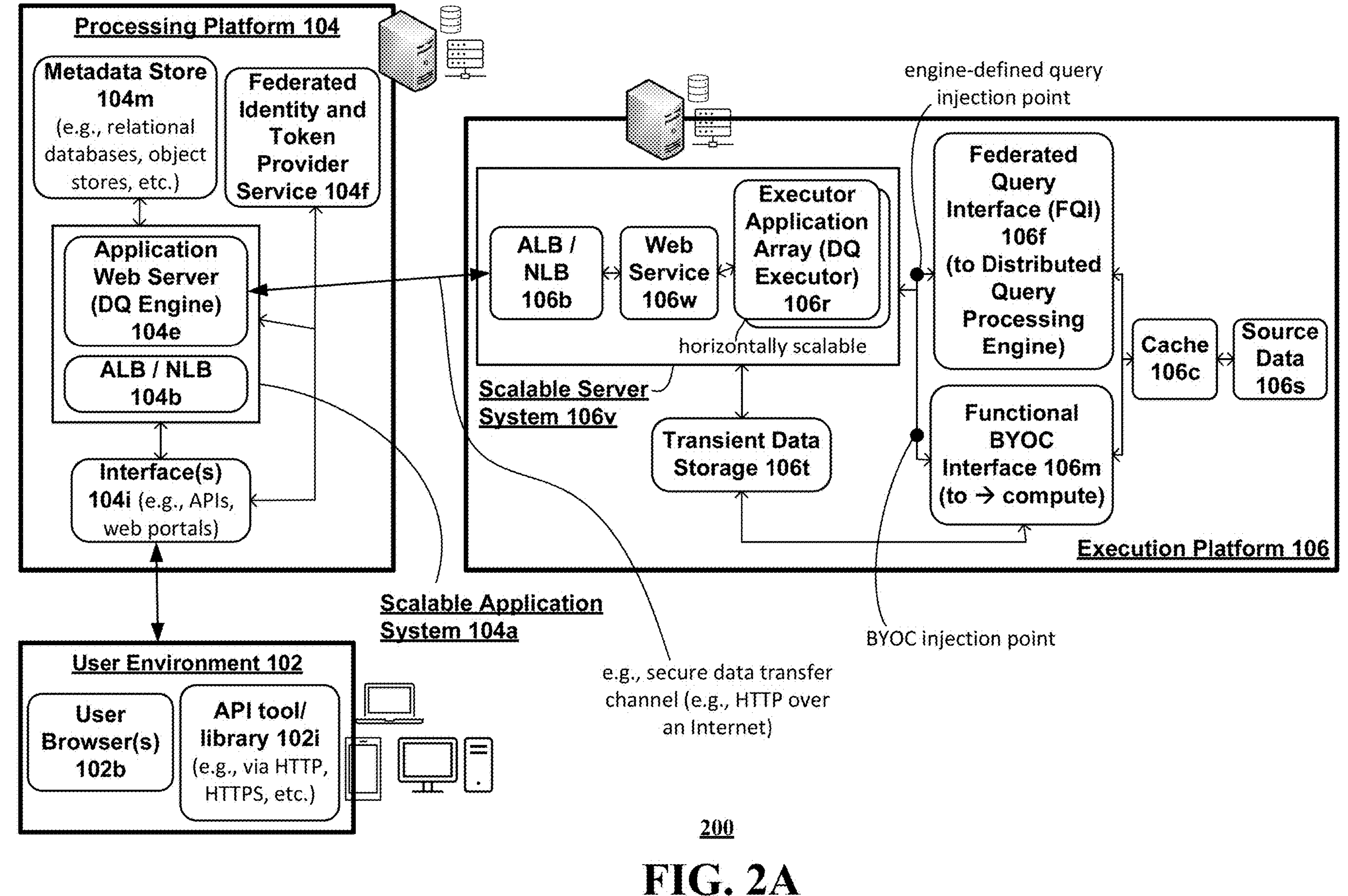
FIG. 2A is a block diagram showing an example implementation of the environment of FIG. 1, in accordance with various aspects described herein.

FIG. 2A is a block diagram showing an example implementation 200 of the environment 100 of FIG. 1. As shown in FIG. 2A, the user environment 102 may provide a user context or a user interface (UI) in the form of data access interfaces. As one example, the data access interfaces may include web browser application(s) 102*b* that provide graphical/textual interface(s) for user-involved interactions with the functionalities of the processing platform 104. As another example, the data access interfaces may include ingress and/or egress API tool(s)/libraries 102*i* (e.g., that allow API requests to be sent via HTTP, Hypertext Transfer Protocol Secure (HTTPS), etc.), including those that enable programmatic interactions with the functionalities of the processing platform 104. In some embodiments, the UI may be a unified UI that enables users and/or development operations administrators that act on behalf of organizations to issue instructions for data quality evaluation purposes and view results (including, for example, errors or exceptions relating to the analysis/processing).

As shown in FIG. 2A, the processing platform 104 may include a scalable application system 104*a*, a metadata store 104*m*, a federated identity and token provider service 104*f*, and interfaces 104*i*. The interfaces 104*i* may enable the user environment 102 to access the functionalities of the processing platform 104. These interfaces may be web-based portals or APIs (e.g., RESTful or Simple Object Access Protocol (SOAP)-based APIs) that provide secure, authenticated, centralized access for users to submit data quality evaluation jobs, retrieve results, and/or inject BYOC algorithms (e.g., via the above-described data access interfaces/UI). In one or more embodiments, these interfaces may be designed to ensure ease of use while maintaining strict security standards to protect access to sensitive operations and data.

The scalable application system 104*a* may include a reverse proxy (OSI Layer 7)/load balancer (OSI Layer 3) 104*b*. For instance, the scalable application system 104*a* may include an OSI Layer 7 application load balancer (ALB) or an OSI Layer 3 network load balancer (NLB). The scalable application system 104*a* may also include a scalable array of applications 104*e*—e.g., an array of HTTP webservers—collectively referred to as a data quality (DQ) engine 104*e*, with application server nodes in memory. The DQ engine 104*e* may be capable of storing and retrieving data quality metrics as well as communicating with the execution platform 106, and more particularly the executor application array 106*r*. In various embodiments, the DQ engine 104*e* may include one or more functions for identifying algorithmic requirements—e.g., the desired data quality evaluation algorithm(s)—for the source data 106*s*, and providing or "injecting" the required algorithm(s) to the executor application array 106*r* for use on the source data 106*s*. Architecting the application system 104*a* in this manner provides a horizontally scalable setup for the DQ Engine 104*e* that allows it to handle varying loads, thereby ensuring consistent performance across multiple users and simultaneous jobs.

The metadata store 104*m* may function as a central data quality repository, and may include one or more storage devices for storing metadata regarding the quality of data—here, in-situ source data 106*s* within the execution platform 106—that has been analyzed/processed. Metadata may include, for instance, schemas, data quality rules, job configurations, and/or historical performance metrics. Metrics may include information regarding detected anomalies/aggregate anomalies, information regarding detected exceptions, summaries of determined data quality, and/or the like. Some or all of the metadata may be available for user review and/or integration with data management systems or workflow systems. In exemplary embodiments, the metadata store 104*m* may not preserve any data that pertains to an organization, such as natural keys or data values. In one or more embodiments, the metadata store 104*m* may be designed for high availability and rapid access to support dynamic data OpenTelemetry Logs Protocol (OLTP) and Online Analytical Processing (OLAP) operations. In various embodiments, the metadata store 104*m* may be implemented using relational databases, object databases, and/or graph databases.

The federated identity and token provider service 104*f* may be a service layer that is configured to facilitate authentication/authorization for accessing data quality metrics and/or leveraging an FQI 106*f*. In various embodiments, the federated identity and token provider service 104*f* may obtain identification token(s) that the processing platform 104 may provide to the execution platform 106, and that the DQ executor 106*r* can use for authorization to the FQI 106*f*.

As shown in FIG. 2A, the execution platform 106 may include a scalable server system 106*v*, the FQI 106*f*, a functional BYOC interface 106*m*, a TDS 106*t*, a cache 106*c*, and the source data 106*s*. The source data 106*s* may include any organizational (e.g., business) data that is to be processed/analyzed for quality. The source data 106*s* may be formatted in any suitable manner, and may include data across various types of data or various data products. Although not shown, in various embodiments, the source data 106*s* may be linked to or fed into the execution platform 106 (whether in the aggregate or in individual chunks) from one or more other systems—e.g., physical or virtual data repositories where the actual data is stored, which may be in a variety of forms, such as, for instance, databases, data lakes, or cloud storage services maintained within a secure, controlled environment to ensure data integrity and security.

The scalable server system 106*v* may include a load balancer 106*b* (e.g., an OSI Layer 7 ALB or an OSI Layer 3 NLB), a web server application 106*w*, and an executor application array 106*r*. The executor application array 106*r* may include a scalable array of application servers—e.g., web application servers (with hardware, software, or a combination thereof)—collectively referred to as a DQ executor 106*r*. An individual executor in the array 106*r* may be capable of executing the data quality evaluation algorithms that have been injected by the DQ engine 104*e* for a given data quality job. In one or more embodiments, the executor may receive commands from the DQ engine 104*e*, and may execute data quality checks (e.g., directly) on the source data 106*s*, thereby generating data quality metrics. The executor may send generated data quality metrics to the processing platform 104. In some embodiments, the executor application array 106*r* may alternatively be maintained as a single instance—i.e., a single executor 106*r*. Thus, it may not be necessary to scale them horizontally to manage varying loads, as all the required processing (i.e., the data quality processing workload) may be performed using serverless compute via the FQI 106*f* and the functional BYOC interface 106*m*.

The FQI 106*f* may enable access to a serverless, distributed query engine that is capable of providing federated, distributed query execution capabilities using user side compute, such as compute infrastructure that may be available within or to the organization. These execution capabilities may be provided by (e.g., third-party) distributed query engines, which can query data across different sources (e.g., without data movement or sharing). The distributed query engines may support complex queries and/or aggregations required for thorough data quality assessments. In this way, the FQI 106*f* may allow for execution of sophisticated queries across distributed data systems without moving or sharing data, thereby ensuring compliance with data locality requirements. The FQI 106*f* may also serve as a bridge to execute complex, cross-database queries (e.g., directly) on the data sources—e.g., retrieving only necessary data into the TDS 106*t* for processing.

The cache 106*c* may include one or more memories that are accessible to systems/functions in the execution platform 106. Positioned logically before the source data 106*s*, the cache 106*c* layer may reduce or minimize the latency and load on the data sources during frequent query executions. The cache 106*c* may enable performance optimization, especially where large datasets or high query volumes are involved. Including such a cache in the execution platform 106 improves data retrieval performance and reduces the memory resource impact on data source systems.

The functional BYOC interface 106*m* may be capable of accepting user-inputted, custom functions (e.g., actual computing functions in the form of code snippets) for execution using user side compute. These custom functions may be requested and/or provided at the user environment 102 to the processing platform 104, which may pass such functions to the execution platform 106 along with other requisite algorithms from the DQ engine 104*e*. Providing such a BYOC interface 106*m* allows for bespoke algorithm(s) to also be injected into the data processing workflow for data analysis/processing. The custom functions may be written in one or more of a variety of programming languages that are supported by the underlying cloud-based or local platform. In various embodiments, the functional BYOC interface 106*m* may provide a runtime environment for such functions, and may manage execution, scaling, and/or security isolation. In this way, the data quality evaluation framework may support extensible and customizable data quality checks, which can be crucial for organizations that need to apply specific business rules or complex data transformations during their quality assessments.

The TDS 106*t* may include one or more memories for storing data with configurable data retention period(s). In exemplary embodiments, the TDS 106*t* layer may manage data spillovers during peak processing times and efficiently handle data paging and caching mechanisms. In one or more embodiments, the TDS 106*t* may provide the capability for direct downloading of pre-calculated, detailed, data quality results. In various embodiments, the TDS 106*t* may enable temporary data caching during intensive computations to enhance performance. In some embodiments, the TDS 106*t* may temporarily store data between processing associated with two or more processing algorithms.

Figure 2B:
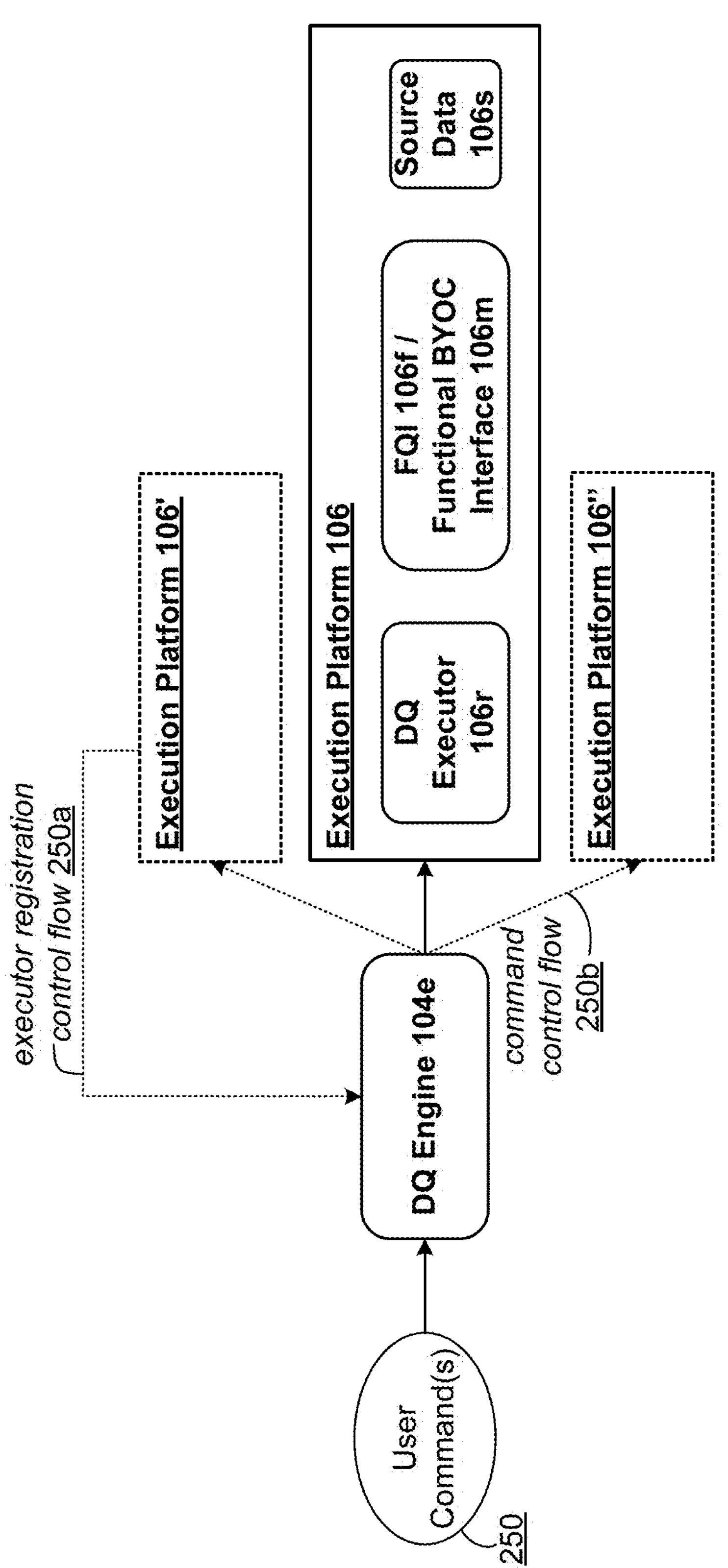
FIG. 2B illustrates example control flows relating to the implementation of FIG. 2A in accordance with various aspects described herein.

FIG. 2B illustrates example control flows relating to the implementation 200 of FIG. 2A. In various embodiments, the framework may operate on a client-server model, where DQ executors of different instances of the execution platform 106 (where one instance is shown as execution platform 106, and where other instances are shown as execution platform 106' and execution platform 106") may register as clients, with the DQ engine 104*e* serving as a command-and-control server. The two primary control flows within this model are shown at 250*a* and 250*b*.

At 250*a*, when a DQ executor 106*r* is instantiated within the corresponding execution platform 106, the DQ executor 106*r* may automatically send a registration request to the DQ engine 104*e* ("home calling"). This may be sent using a static Internet Protocol (IP) address of or a domain name that hosts the DQ engine 104*e*. Upon successful home calling, the DQ executor 106*r* may send connection and location information or metadata to the DQ engine 104*e*, which may then register the corresponding execution platform 106.

The DQ engine 104*e* may support at least two types of commands 250 from a user environment (e.g., the user environment 102 of FIG. 2A). For instance, the DQ engine 104*e* may support data discovery commands and data quality commands. Data discovery commands may enable the discovery of data within an execution platform 106 and registration of related metadata. Data quality commands may (e.g., primarily) encompass data quality assertions and anomaly detection commands—i.e., command control flow 250*b*, which may progress from the user environment 102 to the DQ engine 104*e* of the processing platform 104, and ultimately reach the execution platform 106. At the execution platform level, commands may be interpreted into one or more FQI or functional BYOC interface specific native commands, which may then be executed either serially or in parallel.

As an example, a user, such as an administrator operating on behalf of an organization, may provide inputs (e.g., one or more user commands 250) regarding the source data 106*s* that is to be evaluated as well as any evaluation criteria that are to be used. Continuing the example, the user may additionally input information regarding any custom functions that are to be applied as part of the evaluation. Further continuing the example, the DQ engine 104*e* may identify evaluation algorithm(s) based on the evaluation criteria, and may provide (or inject) the algorithm(s) to the DQ executor 106*r* of the execution platform 106 that corresponds to the organization (e.g., the organization's account). The DQ executor 106*r* may then perform the evaluation using the algorithm(s). The DQ executor 106*r* may issue one or more queries to the FQI 106*f* for distributed query engine assistance as well as request(s) via the functional BYOC interface 106*m* to apply any custom functions that may have been provided by the user. Evaluation results from the various processing may then be provided from the DQ executor 106*r* back to the DQ engine 104*e*, which can then store the results in the metadata store 104*m*. In this way, data metrics (e.g., all data metrics) may be determined from analysis of the source data 106*s* itself in its native environment, thereby providing for in-situ evaluation of sensitive data. The user may then access the evaluation results from the metadata store 104*m* via the user environment 102.

It is to be understood and appreciated that, although one or more of FIGS. 1, 2A, and 2B might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various platforms, environments, systems, engines, executors, devices, components, modules, etc. may have been illustrated in one or more of FIGS. 1, 2A, and 2B as separate platforms, environments, systems, engines, executors, devices, components, modules, etc., it will be appreciated that multiple platforms, environments, systems, engines, executors, devices, components, modules, etc. can be implemented as a single platform, environment, system, engine, executor, device, component, module, etc., or a single platform, environment, system, engine, executor, device, component, module, etc. can be implemented as multiple platforms, environments, systems, engines, executors, devices, components, modules, etc. Additionally, functions described as being performed by one platform, environment, system, engine, executor, device, component, module, etc. may be performed by multiple platforms, environments, systems, engines, executors, devices, components, modules, etc., or functions described as being performed by multiple platforms, environments, systems, engines, executors, devices, components, modules, etc. may be performed by a single platform, environment, system, engine, executor, device, component, module, etc.

Figure 3A:
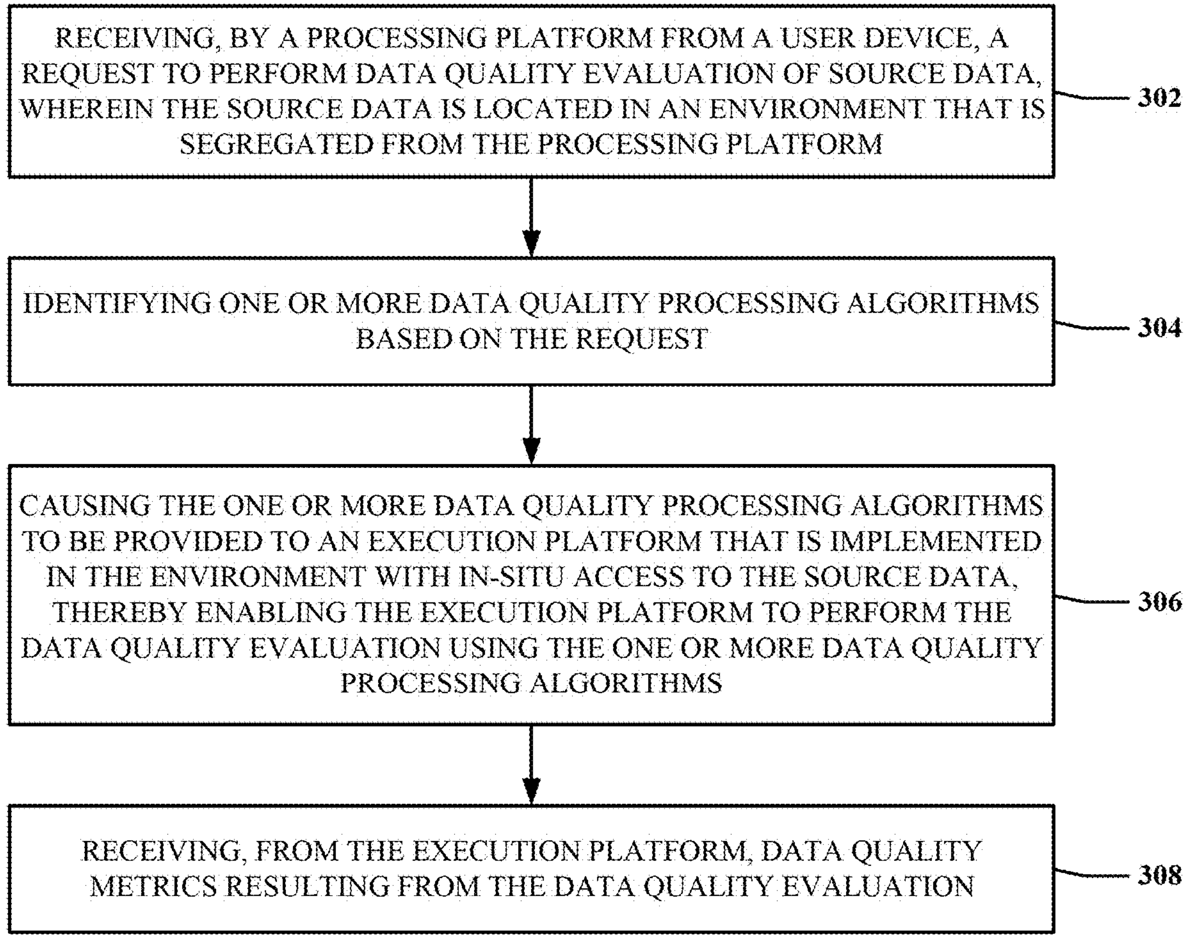
FIG. 3A depicts an illustrative embodiment of a method in accordance with various aspects described herein.

FIG. 3A depicts an illustrative embodiment of a method 300. The method 300 may be at least partially performed by a processing platform, such as the processing platform 104.

At 302, the method can include receiving, from a user device, a request to perform data quality evaluation of source data, wherein the source data is located in an environment that is segregated from the processing platform. For example, the processing platform 104 may, similar to that described above with respect to FIGS. 2A and/or 2B, perform one or more operations that include receiving, from a user device, a request to perform data quality evaluation of source data, wherein the source data is located in an environment that is segregated from the processing platform.

At 304, the method can include identifying one or more data quality processing algorithms based on the request. For example, the processing platform 104 may, similar to that described above with respect to FIGS. 2A and/or 2B, perform one or more operations that include identifying one or more data quality processing algorithms based on the request.

At 306, the method can include causing the one or more data quality processing algorithms to be provided to an execution platform that is implemented in the environment with in-situ access to the source data, thereby enabling the execution platform to perform the data quality evaluation using the one or more data quality processing algorithms. For example, the processing platform 104 may, similar to that described above with respect to FIGS. 2A and/or 2B, perform one or more operations that include causing the one or more data quality processing algorithms to be provided to an execution platform that is implemented in the environment with in-situ access to the source data, thereby enabling the execution platform to perform the data quality evaluation using the one or more data quality processing algorithms.

At 308, the method can include receiving, from the execution platform, data quality metrics resulting from the data quality evaluation. For example, the processing platform 104 may, similar to that described above with respect to FIGS. 2A and/or 2B, perform one or more operations that include receiving, from the execution platform, data quality metrics resulting from the data quality evaluation.

While for purposes of simplicity of explanation, the respective processes are shown and described as a series of blocks in FIG. 3A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3B:
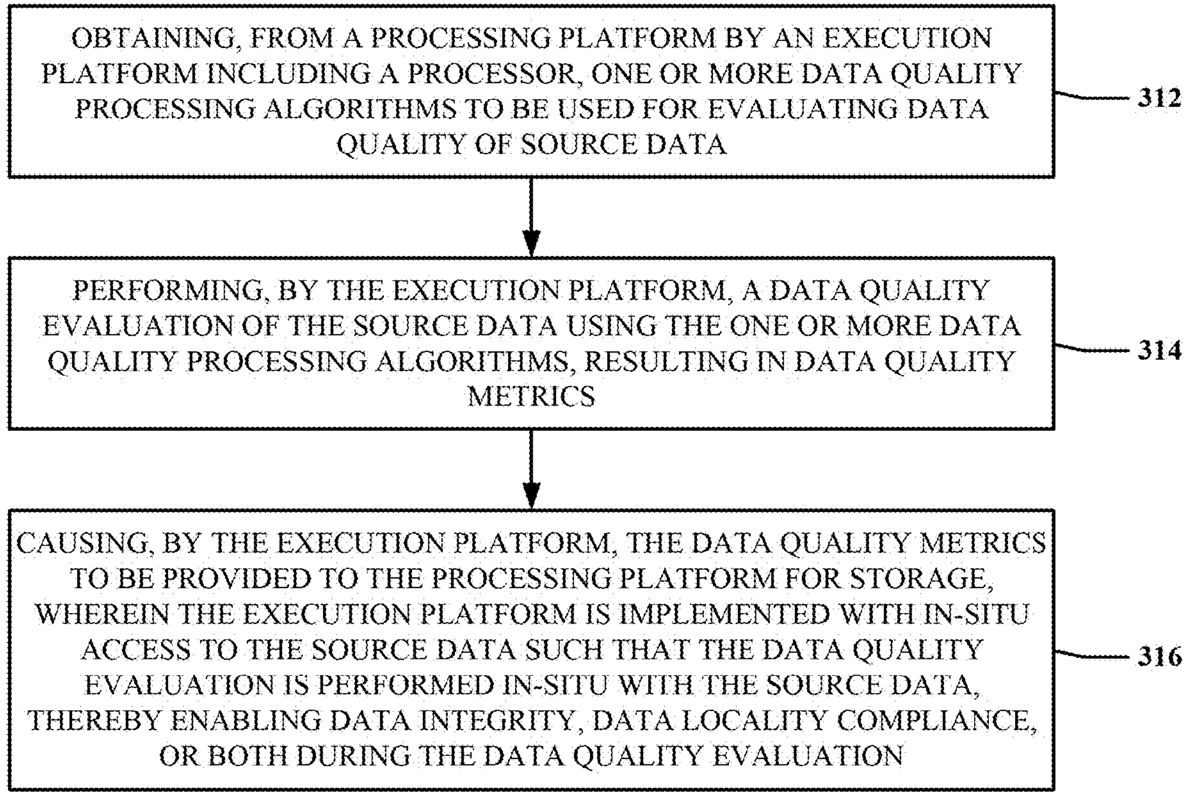
FIG. 3B depicts an illustrative embodiment of a method in accordance with various aspects described herein.

FIG. 3B depicts an illustrative embodiment of a method 310. The method 310 may be at least partially performed by an execution platform, such as the execution platform 106.

At 312, the method can include obtaining, from a processing platform by an execution platform including a processor, one or more data quality processing algorithms to be used for evaluating data quality of source data. For example, the execution platform 106 may, similar to that described above with respect to FIGS. 2A and/or 2B, perform one or more operations that include obtaining, from a processing platform, one or more data quality processing algorithms to be used for evaluating data quality of source data.

At 314, the method can include performing, by the execution platform, a data quality evaluation of the source data using the one or more data quality processing algorithms, resulting in data quality metrics. For example, the execution platform 106 may, similar to that described above with respect to FIGS. 2A and/or 2B, perform one or more operations that include performing a data quality evaluation of the source data using the one or more data quality processing algorithms, resulting in data quality metrics.

At 316, the method can include causing, by the execution platform, the data quality metrics to be provided to the processing platform for storage, wherein the execution platform is implemented with in-situ access to the source data such that the data quality evaluation is performed in-situ with the source data, thereby enabling data integrity, data locality compliance, or both during the data quality evaluation. For example, the execution platform 106 may, similar to that described above with respect to FIGS. 2A and/or 2B, perform one or more operations that include causing the data quality metrics to be provided to the processing platform for storage, wherein the execution platform is implemented with in-situ access to the source data such that the data quality evaluation is performed in-situ with the source data, thereby enabling data integrity, data locality compliance, or both during the data quality evaluation.

While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
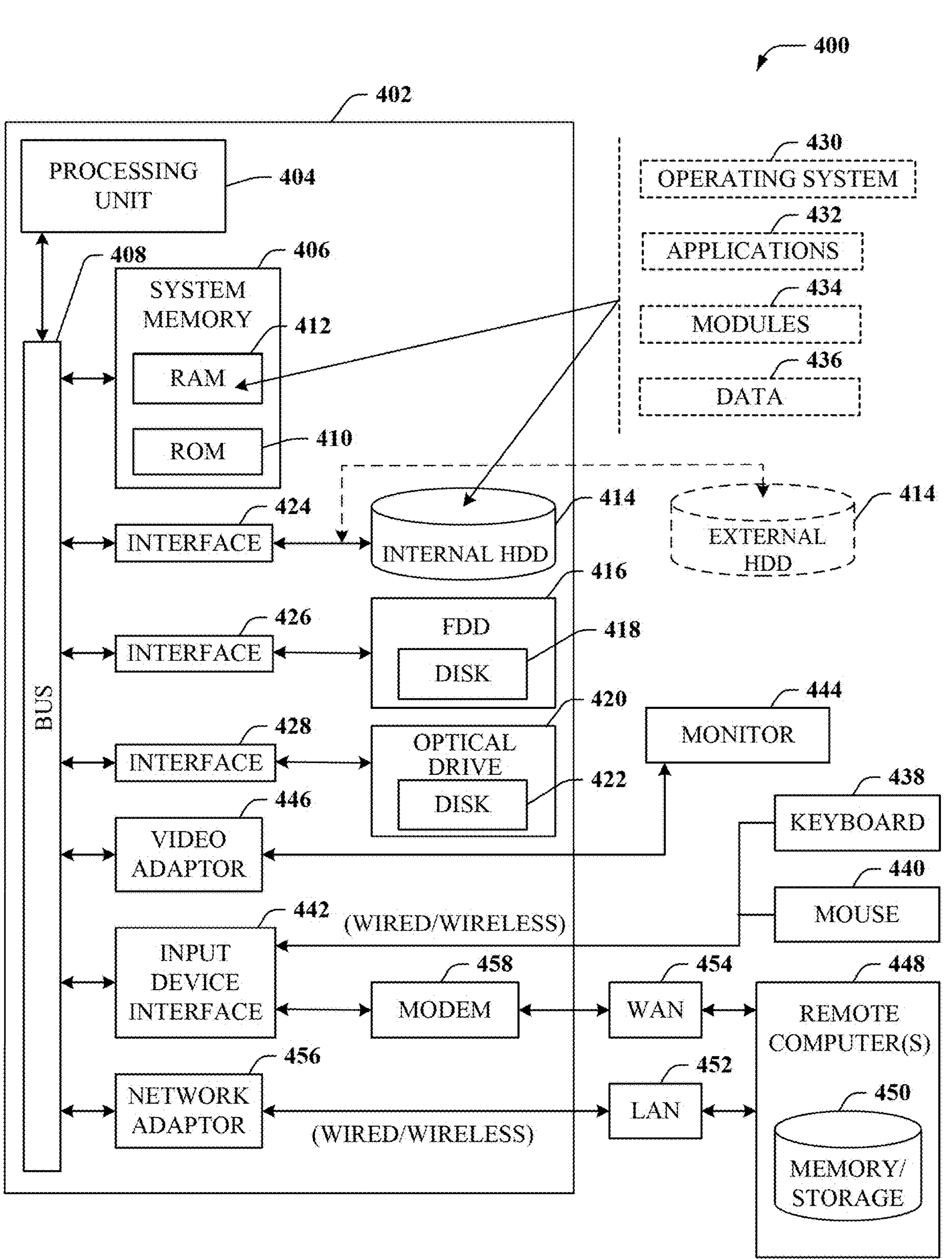
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, computing environment 400 can facilitate, in whole or in part, in-situ quality evaluation of sensitive data.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

What is claimed is:

1. A system, comprising:

a processing platform that is implemented in a first environment operated by a data quality evaluation services provider, the processing platform being configured to:

analyze data quality evaluation requirements associated with source data of a first entity that is different from the data quality evaluation services provider, identify one or more data quality evaluation algorithms based at least in part on an analysis of the data quality evaluation requirements, and store metadata relating to evaluation of the source data; and an execution platform that is deployed in a local or cloud-based environment associated with the first entity, the execution platform being segregated from the processing platform by one or more networks, the execution platform being configured to:

receive the one or more data quality evaluation algorithms from the processing platform and execute the one or more data quality evaluation algorithms for the evaluation of the source data to derive data quality metrics, and provide the data quality metrics to the processing platform for storage as the metadata, wherein the execution platform performs the evaluation of the source data of the first entity in situ without the source data of the first entity being accessible outside of the execution platform, including to the data quality evaluation services provider through the processing platform, thereby ensuring data integrity, data locality compliance, or both.

2. The system of claim 1, wherein the processing platform comprises a metadata store for storing the metadata.

3. The system of claim 2, wherein the data quality evaluation services provider also provides the execution platform for deployment in the local or cloud-based environment associated with the first entity.

4. The system of claim 1, wherein the processing platform comprises one or more interfaces configured to enable user interaction with the processing platform, and wherein the one or more interfaces comprise one or more web-based portals, one or more application programming interfaces (APIs), or a combination thereof for facilitating user submission of data quality evaluation jobs, user submission of the data quality evaluation requirements, user submission of bring your own code (BYOC) data quality evaluation algorithms, user accessing of the metadata, or a combination thereof.

5. The system of claim 1, further comprising a second execution platform that is deployed in a second local or cloud-based environment associated with a second entity different from the first entity and the data quality evaluation services provider, wherein the processing platform analyzes second data quality evaluation requirements associated with second source data of the second entity, identifies one or more second data quality evaluation algorithms based at least in part on an analysis of the second data quality evaluation requirements, and stores second metadata relating to evaluation of the second source data, wherein the second execution platform is segregated from the processing platform by one or more second networks, and wherein the second execution platform receives the one or more second data quality evaluation algorithms from the processing platform, executes the one or more second data quality evaluation algorithms for the evaluation of the second source data to derive second data quality metrics, and provides the second data quality metrics to the processing platform for storage as the second metadata, the processing platform thereby providing in-situ data quality evaluation services for different entities via different deployed execution platforms.

6. The system of claim 1, wherein the execution platform comprises an in-situ execution module that executes the one or more data quality evaluation algorithms, one or more bring your own code (BYOC) data quality evaluation algorithms, or a combination thereof.

7. The system of claim 1, wherein the execution platform comprises a scalable architecture of application servers for facilitating varying loads.

8. The system of claim 1, wherein the execution platform comprises a federated query interface (FQI) that integrates with one or more third-party distributed query engines for executing queries across distributed data systems without transmitting the source data.

9. The system of claim 1, wherein the execution platform comprises an interface for facilitating injection of custom functions for use in the evaluation.

10. The system of claim 1, wherein the execution platform comprises a caching layer configured to reduce a load on primary data storage systems during the evaluation.

11. The system of claim 1, wherein the evaluation is performed in real-time or in batch mode.

12. The system of claim 1, wherein the execution platform comprises a transient data storage configured to cache data during the evaluation, enable downloading of the data quality metrics, or a combination thereof.

13. The system of claim 1, wherein an executor in the execution platform is configured to submit a registration request to the processing platform upon instantiation of the executor to facilitate registration of the execution platform with the processing platform.

14. The system of claim 1, wherein the processing platform is configured to control the evaluation by performing one or more of the following:

facilitating data discovery;

registering metadata;

processing data quality commands; or a combination thereof.

15. The system of claim 1, wherein the one or more networks include an Internet.

16. A non-transitory machine-readable medium, comprising executable instructions that, when executed by a processing platform including a processor, facilitate performance of operations, the operations comprising:

receiving, from a user device, a request to perform data quality evaluation of source data of a first entity, wherein the source data is located in an environment associated with the first entity that is segregated from the processing platform, and wherein the processing platform is operated by a data quality evaluation services provider that is different from the first entity;

identifying one or more data quality processing algorithms based on the request;

causing the one or more data quality processing algorithms to be provided to an execution platform that is deployed in the environment associated with the first entity, thereby enabling the execution platform to perform the data quality evaluation of the source data of the first entity using the one or more data quality processing algorithms, wherein the execution platform performs the data quality evaluation of the source data of the first entity in situ without the source data of the first entity being accessible outside of the execution platform, including to the data quality evaluation services provider through the processing platform, thereby ensuring data integrity, data locality compliance, or both; and receiving, from the execution platform, data quality metrics resulting from the data quality evaluation.

17. The non-transitory machine-readable medium of claim 16, wherein the operations further comprise:

receiving information regarding at least one custom algorithm to be used in the data quality evaluation; and causing the information to be provided to the execution platform, thereby enabling the execution platform to utilize the at least one custom algorithm in the data quality evaluation.

18. The non-transitory machine-readable medium of claim 16, wherein the data quality evaluation services provider operates the processing platform and provides the execution platform for deployment in the environment associated with the first entity.

19. A method, comprising:

obtaining, from a processing platform by an execution platform including a processor, one or more data quality processing algorithms to be used for evaluating data quality of source data of a first entity, wherein the processing platform is implemented in a first environment operated by a data quality evaluation services provider, wherein the execution platform is deployed in a local or cloud-based environment associated with the first entity, and wherein the execution platform is segregated from the processing platform by one or more networks;

performing, by the execution platform, a data quality evaluation of the source data using the one or more data quality processing algorithms, resulting in data quality metrics; and causing, by the execution platform, the data quality metrics to be provided to the processing platform for storage, wherein the execution platform performs the data quality evaluation of the source data of the first entity in situ without the source data of the first entity being exposed outside of the execution platform, including to the data quality evaluation services provider through the processing platform, thereby enabling data integrity, data locality compliance, or both during the data quality evaluation.

20. The method of claim 19, wherein the processing platform identifies the one or more data quality processing algorithms in response to a user request to evaluate the source data.

* * * * *